United States Patent
Kravets et al.

(10) Patent No.: US 10,852,411 B2
(45) Date of Patent: Dec. 1, 2020

(54) MOTION DETECTION AND LOCALIZATION BASED ON BI-DIRECTIONAL CHANNEL SOUNDING

(71) Applicant: Cognitive Systems Corp., Waterloo (CA)

(72) Inventors: Oleksiy Kravets, Petersburg (CA); Tajinder Manku, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 16/165,546

(22) Filed: Oct. 19, 2018

(65) Prior Publication Data

US 2019/0170869 A1 Jun. 6, 2019

Related U.S. Application Data

(60) Provisional application No. 62/595,331, filed on Dec. 6, 2017.

(51) Int. Cl.
*G01S 13/56* (2006.01)
*G01S 7/41* (2006.01)
*G01S 13/00* (2006.01)

(52) U.S. Cl.
CPC ............... *G01S 13/56* (2013.01); *G01S 7/41* (2013.01); *G01S 13/003* (2013.01)

(58) Field of Classification Search
CPC ........... G01S 13/56; G01S 7/41; G01S 13/003
See application file for complete search history.

(56) References Cited

U.S. PATENT DOCUMENTS 4,054,879 A 10/1977 Wright et al.
4,649,388 A 3/1987 Atlas
(Continued)

FOREIGN PATENT DOCUMENTS

CA 2834522 5/2014
WO 2014/201574 12/2014
(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
(Continued)

*Primary Examiner* — Marcus E Windrich
(74) *Attorney, Agent, or Firm* — Henry Patent Law Firm PLLC

(57) ABSTRACT

In a general aspect of the examples described, motion is detected based on bi-directional channel sounding. In an example, a first set of channel information is obtained from a first device. The first set of channel information is based on a first set of wireless signals transmitted from a second device through a space at a first time in a timeframe. A second set of channel information is obtained from the second device. The second set of channel information is based on a second set of wireless signals transmitted from the first device through the space at a second time in the timeframe. The first and second sets of channel information are analyzed to detect a category of motion or a location of detected motion in the space during the timeframe.

27 Claims, 8 Drawing Sheets

(56) References Cited

U.S. PATENT DOCUMENTS

| | | | |
|---|---|---|---|
| 4,740,045 A | 4/1988 | Goodson et al. | |
| 5,270,720 A | 12/1993 | Stove | |
| 5,696,514 A | 12/1997 | Nathanson et al. | |
| 6,075,797 A | 6/2000 | Thomas | |
| 6,573,861 B1 | 6/2003 | Hommel et al. | |
| 7,652,617 B2 | 1/2010 | Kurtz et al. | |
| 8,660,578 B1 | 2/2014 | Yang et al. | |
| 8,836,344 B2* | 9/2014 | Habib | G08B 13/2491 324/647 |
| 9,019,148 B1* | 4/2015 | Bikhazi | G01S 13/56 342/28 |
| 9,030,321 B2 | 5/2015 | Breed | |
| 9,523,760 B1 | 12/2016 | Kravets et al. | |
| 9,524,628 B1 | 12/2016 | Omer et al. | |
| 9,584,974 B1* | 2/2017 | Omer | H04B 17/309 |
| 9,743,294 B1 | 8/2017 | Omer et al. | |
| 9,927,519 B1 | 3/2018 | Omer et al. | |
| 9,933,517 B1 | 4/2018 | Olekas et al. | |
| 9,989,622 B1 | 6/2018 | Griesdorf et al. | |
| 10,004,076 B1 | 6/2018 | Griesdorf et al. | |
| 10,129,853 B2* | 11/2018 | Manku | G08B 13/2491 |
| 2003/0108119 A1 | 6/2003 | Mohebbi et al. | |
| 2007/0296571 A1 | 12/2007 | Kolen | |
| 2008/0119130 A1 | 5/2008 | Sinha | |
| 2008/0240008 A1 | 10/2008 | Backes et al. | |
| 2008/0303655 A1* | 12/2008 | Johnson | G08G 1/01 340/539.16 |
| 2009/0062696 A1 | 3/2009 | Nathan et al. | |
| 2010/0130229 A1 | 5/2010 | Sridhara et al. | |
| 2010/0315284 A1 | 12/2010 | Trizna et al. | |
| 2012/0115512 A1 | 5/2012 | Grainger et al. | |
| 2012/0146788 A1* | 6/2012 | Wilson | G08B 13/02 340/539.23 |
| 2013/0113647 A1 | 5/2013 | Sentelle et al. | |
| 2013/0162459 A1* | 6/2013 | Aharony | G01S 13/04 342/27 |
| 2013/0283256 A1 | 10/2013 | Proud | |
| 2014/0135042 A1 | 5/2014 | Buchheim et al. | |
| 2014/0247179 A1* | 9/2014 | Furuskog | G01S 13/04 342/28 |
| 2014/0286380 A1 | 9/2014 | Prager et al. | |
| 2015/0043377 A1 | 2/2015 | Cholas et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0195100 A1 | 7/2015 | Imes et al. | |
| 2015/0212205 A1* | 7/2015 | Shpater | G01S 13/38 342/28 |
| 2015/0245164 A1 | 8/2015 | Merrill | |
| 2015/0338507 A1 | 11/2015 | Oh et al. | |
| 2016/0018508 A1* | 1/2016 | Chen | G01S 5/0252 455/456.1 |
| 2016/0178741 A1* | 6/2016 | Ludlow | G01S 7/003 342/28 |
| 2016/0183059 A1 | 6/2016 | Nagy et al. | |
| 2016/0187475 A1 | 6/2016 | Horng et al. | |
| 2016/0210838 A1 | 7/2016 | Yan et al. | |
| 2016/0217683 A1* | 7/2016 | Li | G08B 25/08 |
| 2017/0042488 A1 | 2/2017 | Muhsin | |
| 2017/0055131 A1* | 2/2017 | Kong | H04W 40/246 |
| 2017/0146656 A1 | 5/2017 | Belsley et al. | |
| 2017/0278374 A1 | 9/2017 | Skaaksrud | |
| 2017/0280351 A1 | 9/2017 | Skaaksrud | |
| 2017/0311279 A1 | 10/2017 | Allegue Martinez et al. | |
| 2017/0343658 A1* | 11/2017 | Ramirez | G08B 13/2491 |

FOREIGN PATENT DOCUMENTS

| | | |
|---|---|---|
| WO | 2015/168700 | 11/2015 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017/210770 | 12/2017 |
| WO | 2018/094502 | 5/2018 |

OTHER PUBLICATIONS

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

WIPO, International Search Report and Written Opinion dated Mar. 12, 2019, in PCT/CA2018/051543, 9 pgs.

* cited by examiner

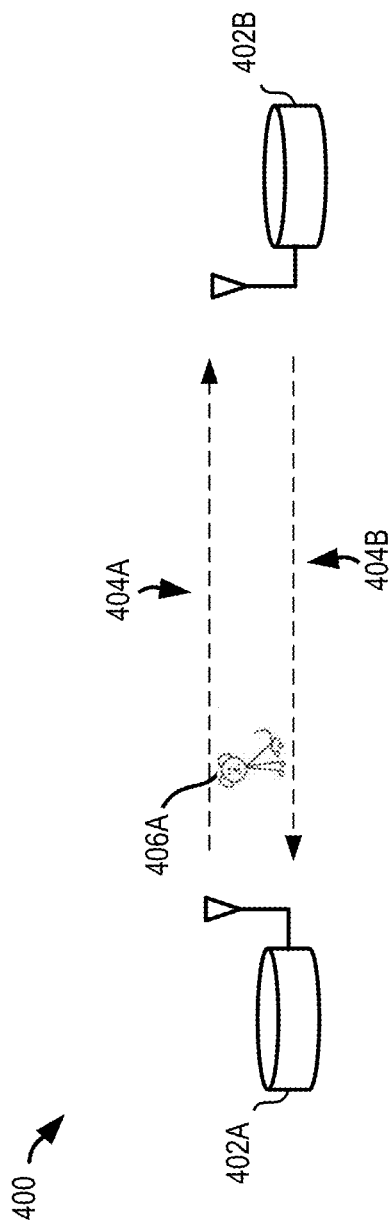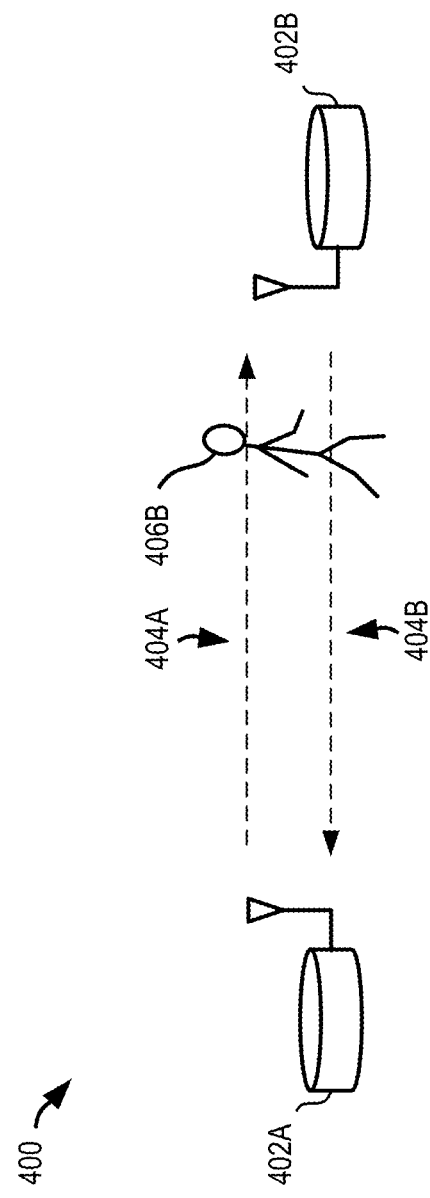
Fig. 4A
Fig. 4B

MOTION DETECTION AND LOCALIZATION BASED ON BI-DIRECTIONAL CHANNEL SOUNDING

This application claims priority to U.S. Provisional Application No. 62/595,331 entitled "Motion Detection and Localization Based on Bi-Directional Channel Sounding" and filed Dec. 6, 2017, which is hereby incorporated by reference.

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 4A and 4B are diagrams of an example motion detection system based on bi-directional channel sounding.

DETAILED DESCRIPTION

Figure 1:
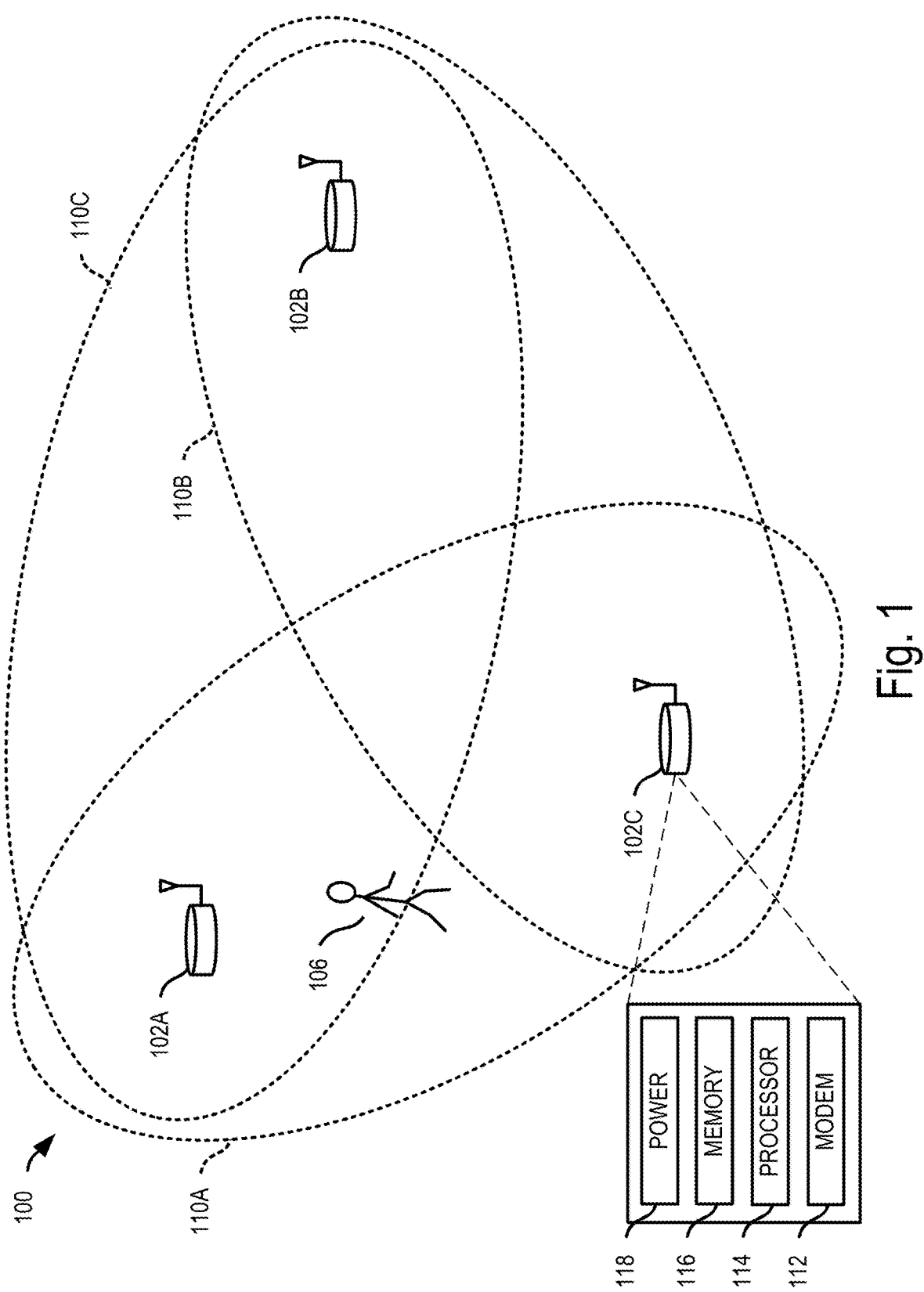
FIG. 1 is a diagram showing an example wireless communication system.

In some aspects of what is described here, motion in a space can be detected based on bi-directional channel sounding. Channel sounding may refer to an evaluation of a radio environment and monitoring wireless channel state information over time when a first wireless device transmits a wireless signal that has known characteristics (e.g., a reference signal) and a second wireless device receives the transmitted signal and analyses a channel impact on the transmitted signal (since the characteristics of the transmitted signal are known). Bi-directional channel sounding may refer to channel sounding performed by a pair of wireless communication devices in both directions (e.g., sequentially). For example, in some implementations, a channel is sounded from a first wireless device (TX) toward a second wireless device (RX), and thereafter from the second wireless device (TX) toward the first wireless device (RX). The bi-directional channel sounding may be performed within a timeframe small enough to be considered negligible from the human kinematics standpoint (e.g., on the order of milliseconds (ms)), such that measurements taken in each direction may be compared with one another.

Channel information from both wireless devices may then be communicated to a designated device (e.g., a wireless device designated as a hub, a master wireless device, a server communicably coupled to the wireless devices (e.g., in the cloud), or another device). The channel information may include measured channel state information (CSI), such as a channel response, or may include beamforming steering state information, such as a steering or feedback matrix generated according to the IEEE 802.11ac-2013 standard, which is hereby incorporated by reference. CSI may refer to known channel properties of a communication link, and may describe how a wireless signal propagates from a transmitter to a receiver, representing the combined effect of, for example, scattering, fading, and power decay within the space between the transmitter and receiver. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming matrix may include a mathematical description of how the antenna array should use each of its individual antenna elements to select a spatial path for transmission. Although certain aspects are described herein with respect to channel state information, beamforming state information or beamformer steering matrix state may be used in the aspects described as well.

The designated device then analyzes the information sent from the devices to detect whether motion occurred in the space traversed by the wireless signals. For example, the designated device may analyze the channel state information or beamforming state information provided by two or more wireless devices to detect whether a channel variation has occurred, which may be caused by motion of an object in the space. In some cases, the designated device may analyze whether there are substantial variances between the measured information from the wireless devices. The analysis may be used to determine a location of detected motion. For example, if the first wireless device reports a substantially larger detected channel variation compared to the second wireless device, then the designated device may determine that an object was moving in closer proximity to the second wireless device. Similarly, if the first wireless device reports a substantially smaller detected channel variation compared to the second wireless device, then the designated device may determine that an object was moving in closer proximity to the first wireless device. States in between these two states (close to one sensor vs. the other) may also be determined. For example, if the detected channel variation is approximately the same as both wireless devices, the designated device may determine that the detected motion occurred in a "middle zone" between the two devices.

Bi-directional channel sounding may also be used to provide a confidence level for motion detection, and may allow for more effective suppression of false-positive detections (e.g., when one of the wireless devices erroneously "detects" motion due to non-environmental changes, such as wireless interference, noise, or system-induced measurement impairments). In such case, if motion is being reported by one wireless device and not by the other wireless device (for a certain period of time; specific temporal signature or other metrics may apply), the designated device may provide a determination that motion did not occur in the space.

Aspects of the present disclosure may provide one or more advantages in some instances. For example, motion may be detected based on wireless signals without the need for a line-of-sight between devices and with fewer false-positives. Motion may be detected using existing wireless communication devices and networks. In addition, a location of detected motion may be determined.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some implementations, the motion probe signals include standard signaling or communication frames that include standard pilot signals used in channel sounding (e.g., channel sounding for beamforming according to the IEEE 802.11ac-2013 standard, which is hereby incorporated by reference). In some cases, the motion probe signals include reference signals known to all devices in the network. In some instances, the baseband subsystem processes received motion detection signals (signals based on motion probe signals transmitted through the space), for example, to detect motion of an object in a space. For example, the baseband subsystem may analyze aspects of standard signaling protocols (e.g., channel sounding for beamforming according to the IEEE 802.11ac-2013 standard, such as, based on the steering or other matrix generated) to detect changes in the channel as a result of motion in the space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for analyzing channel state information, beamforming state information, beamforming steering matrix state information, or other information that is based on bi-directional channel sounding to detect motion of an object in a space, such as through one or more of the operations of the example process 600 of FIG. 6.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., as described above), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 3-4, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), pilot signals (e.g., pilot signals used for channel sounding, such as in beamforming applications), or another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (e.g., as described above) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device. In some instances, the wireless communication devices 102 may perform bi-directional channel sounding as described below to detect motion of the object 106.

Figure 2B:
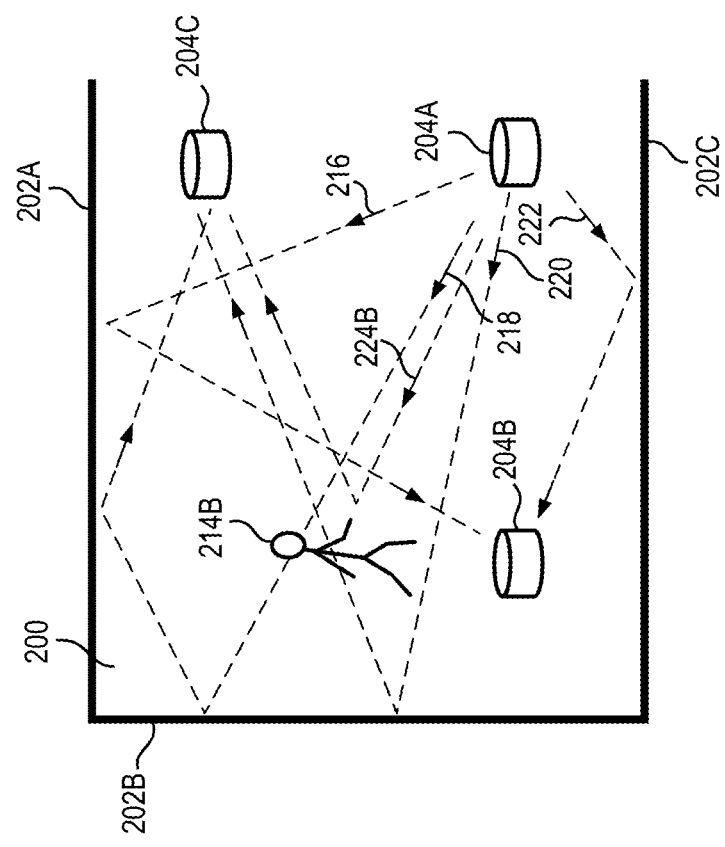
FIGS. 2A and 2B are diagrams showing example wireless signals communicated between wireless communication devices.
Figure 2A:
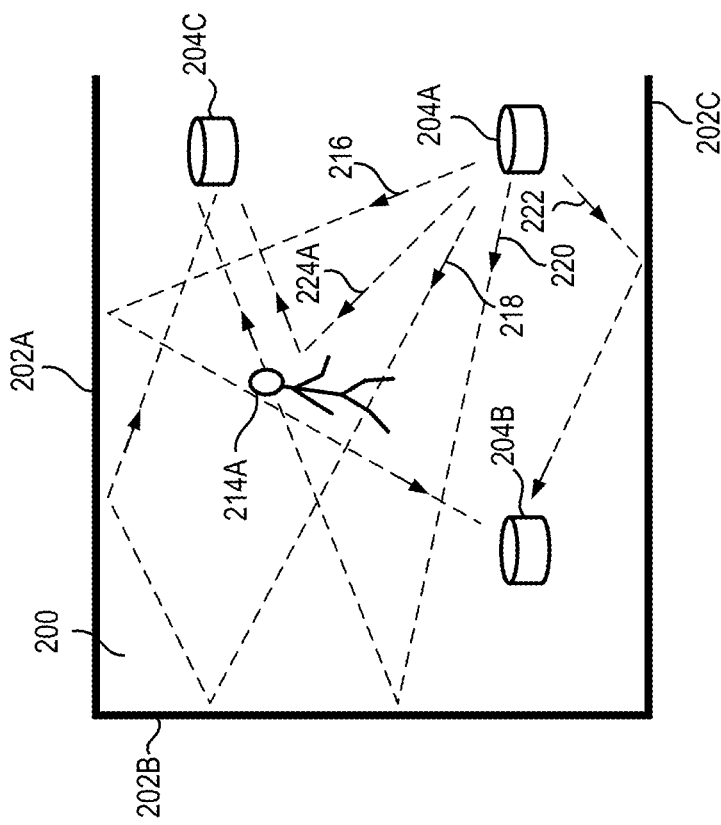

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or other types of wireless communication devices. The example wireless communication devices 204A, 204B, 204C transmit wireless signals through a space 200. The example space 200 can be completely or partially enclosed or open at one or more boundaries of the space 200. The space 200 can be or can include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.). The second and third wireless communication devices 204B, 204C are operable to receive signals based on the motion probe signals transmitted by the wireless communication device 204A. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard, which is hereby incorporated by reference). The wireless communication devices 204B, 204C each have a modem, processor, or other component that is configured to process received motion detection signals to detect motion of an object in the space 200.

As shown, an object is in a first position 214A in FIG. 2A, and the object has moved to a second position 214B in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between FIGS. 2A and 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A can repeatedly transmit a wireless signal. In particular, FIG. 2A shows the wireless signal being transmitted from the first wireless communication device 204A at a first time, and FIG. 2B shows the same wireless signal being transmitted from the first wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \quad (5)$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_k \sum_{n=-\infty}^{\infty} \alpha_{n,k}. \quad (6)$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k) h_{ch}(k) \quad (7)$$

with the optimization criterion $$\min_{h_{ch}} \sum (\hat{R}_{cvd} - R_{cvd})^2. \quad (8)$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
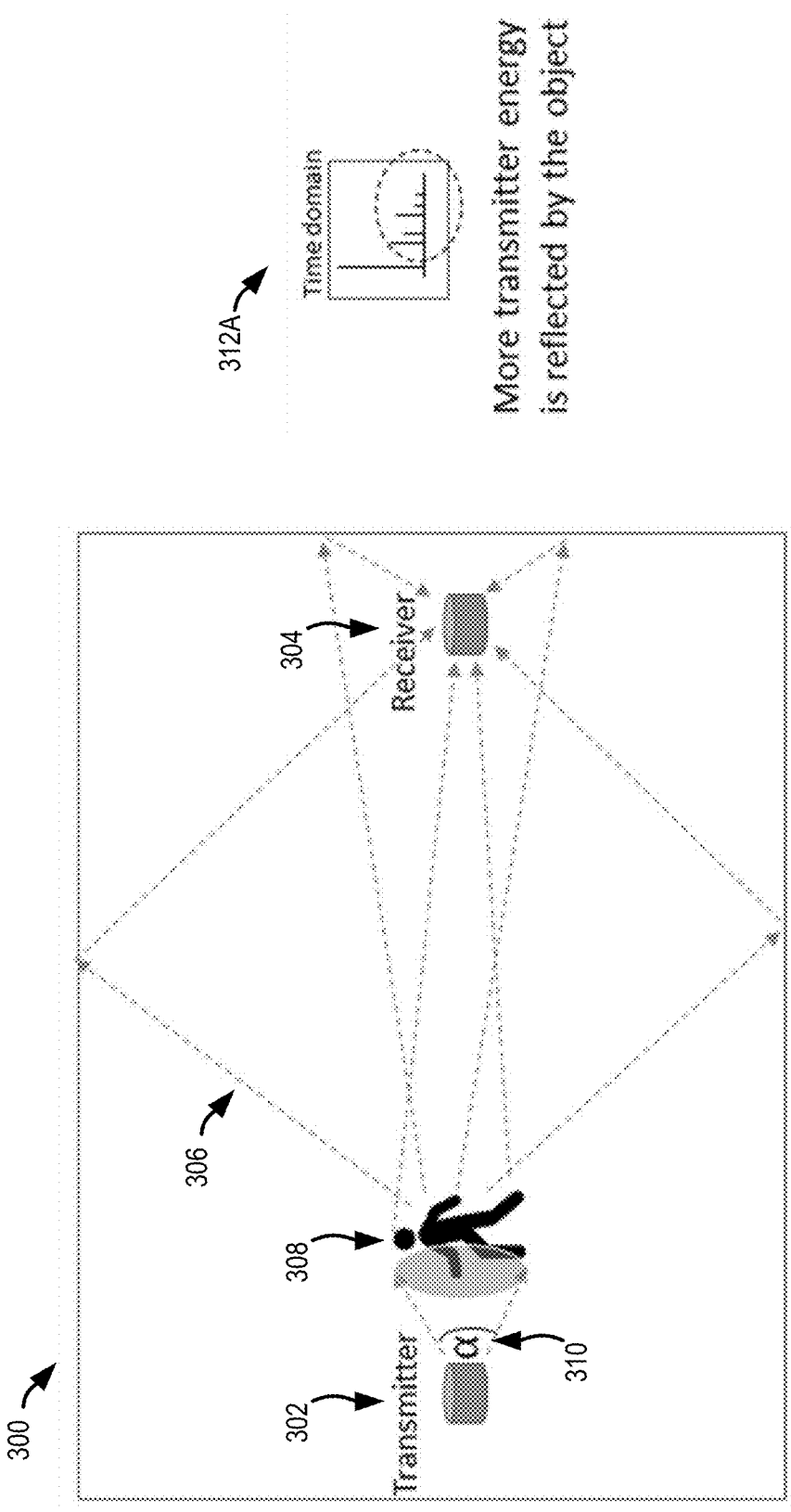
FIGS. 3A and 3B are diagrams of an example motion detection system.
Figure 3B:
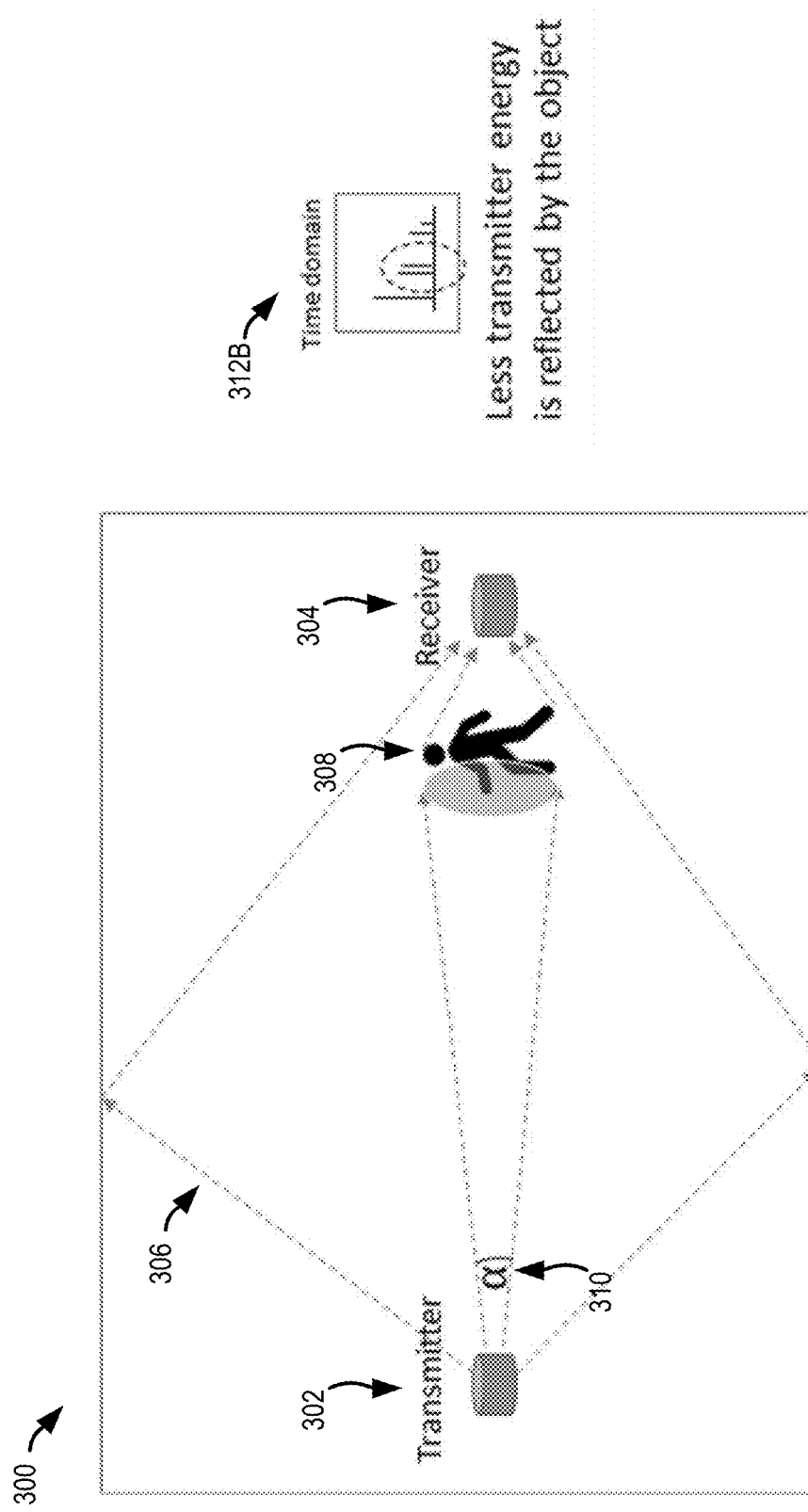

FIGS. 3A and 3B are diagrams of an example motion detection system 300. The example motion detection system 300 includes a transmitter 302 and a receiver 304, which communication with one another via wireless signals 306. The transmitter 302 and receiver 304 may be implemented similar to the wireless communication devices 102 of FIG. 1. As shown, the wireless signals 306 traverse the space in a number of different directions, reflecting off walls or other physical boundaries. Because of this, the wireless signals 306 each arrive at the receiver 304 at different times, as shown in the time domain plots 312. The time domain plots 312 may be used to compute or otherwise obtain channel state information, such as a channel response, beamforming state information, beamforming steering matrix state information, or other information that represents the effective transfer function of the space.

In the example shown, objects moving close to the transmitter 302 (as shown in FIG. 3A) intersect with the larger surface of the wireless RF signal represented as a three-dimensional sphere of transmitted RF energy. This is because a larger contact surface between RF signal and a moving object leads to a larger solid angle (a) 310 between the transmitter 302 and the moving object 308. As a result, more RF energy is reflected in different directions from the moving object compared to the object of the same size moving at a further distance from the transmitter 302 (as shown in FIG. 3B). A solid angle may refer to the two-dimensional angle in three-dimensional space that an object subtends at a point. It may include a measure of how large the object appears to an observer looking from that point. In some cases, a small object near the transmitter 302 may subtend the same solid angle as a larger object further away. Because of this phenomenon, when channel sounding is performed in a single direction (e.g., only through the signal 304A transmitted from the device 302A to the device 302B), it may be difficult to determine if a detected change in the channel state has been caused by a larger object moving further away from transmitter or smaller object moving closer to the transmitter and causing same rate of channel disturbance.

FIGS. 4A and 4B are diagrams of an example motion detection system 400 based on bi-directional channel sounding. The example motion detection system 400 includes a pair of wireless devices 402 communicating with one another. The wireless devices 402 may be implemented similar to the wireless communication devices 102 of FIG. 1. The wireless devices 402 may communicate with one another using radio frequency (RF) signals (e.g., signals formatted according to the 802.11 standard), or other types of wireless signals. In the example shown, the wireless device 402A transmits a signal 404A to perform channel sounding in one direction, and the wireless device 402B transmits a signal 404B to perform channel sounding in the opposite direction. Based on the transmitted signals 404, each wireless device 402 may determine channel state information for the space traversed by the signals 404. In some cases, the signal 404B is sent after the signal 404A (e.g., sequentially). The devices 402 may transmit the determined channel state information (e.g., channel responses) to a designated device as described above, which may analyze the channel state information from both devices 402 to detect motion of the objects 406 (the dog 406A and the human 406B). Although described below with regard to analyzing channel state information, beamforming state information, beamforming steering matrix state information, or other information that represents the effective transfer function of the space may be analyzed in addition to, or instead of, channel state information.

In the examples shown, single-direction channel sounding techniques may provide for a similar motion conclusion in both scenarios of FIGS. 4A, 4B due to the objects 406 causing similar solid angles for the wireless device 402A. For instance, in the examples shown, when the dog 406A moves near the wireless device 402A (as shown in FIG. 4A), it causes very large disturbances to the signal 404A, which may be similar to the disturbance caused by the larger human 406B further away from the wireless device 402A (as shown in FIG. 4B), causing a similar solid angle. The solid angles caused by wireless devices 402A and 402B may be similar when the differences between the solid angles is below a certain threshold, e.g. within 0-10 degrees difference. In some cases, the threshold may be another value that represents a difference in the angles greater than 10 degrees difference. In some cases, a channel variance associated with wireless devices 402A, 402B may be indicated by a measurement other than a solid angle. In that case, the channel variance associated with wireless device 402A may be similar to a channel variance associated with wireless device 402B if the channel variance associated with wireless device 402A is within a threshold value of the channel variance associate with wireless device 402B. Thus, with single-direction channel sounding, it may be determined in both scenarios that there is motion of a large object (e.g., a human) in the space traversed by the signal 404A, which may or may not be accurate. However, by using bi-directional channel sounding, a category of motion may be determined (e.g., whether the object in the space is a large (human) or small (dog) object). In addition, a relative location of the detected motion may be determined.

For instance, in the example shown in FIG. 4A, channel state information may be obtained based on both signals 404A, 404B. The channel state information determined at the wireless device 402A (based on the signal 404B) may show a relatively small channel perturbation due to the object moving in the space (the dog 406A) being relatively small, while the channel state information determined at the wireless device 402B (based on the signal 404A) may show a relatively large channel perturbation. The two sets of channel state information can be compared or otherwise analyzed to determine that the moving object is a small object, and that the small object is moving closer to the device 402A than the device 402B.

Similarly, in the example shown in FIG. 4B, channel state information determined at the wireless device 402A (based on the signal 404B) may show a relatively large channel perturbation due to the object moving in the space (the human 406B) being relatively large (and close to the source of the signal 404B), while the channel state information determined at the wireless device 402B (based on the signal 404A) may show a more moderate channel perturbation. The two sets of channel state information can be compared or otherwise analyzed to determine that the moving object is a larger object, and that the object is moving closer to the device 402B than the device 402A.

In some implementations, bi-directional channel sounding can be performed between multiple devices in a wireless communication network. For instance, referring to the example shown in FIG. 1, bi-directional channel sounding may be performed between the wireless communication devices 102A, 102B, between the wireless communication devices 102A, 102C, and between the wireless communication devices 102B, 102C. Channel state information may be determined based on a bi-directional analysis as described above for each respective pair of devices 102, and the sets of channel state information may be analyzed to determine that the object 106 is within the first motion detection field 110A and relatively equidistant between the devices 102A, 102C.

Figure 5A:
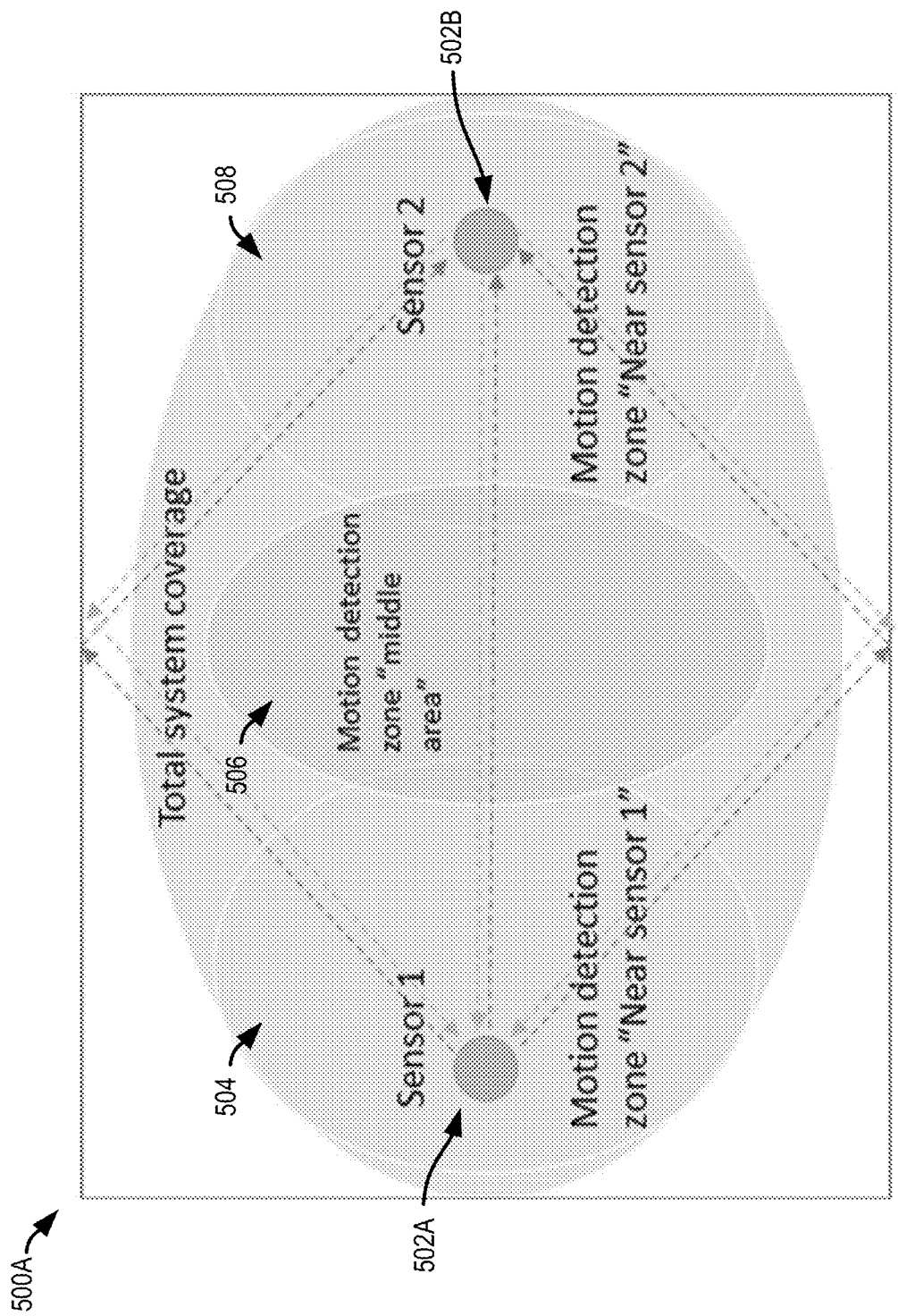
FIGS. 5A and 5B are diagrams showing example motion localization zones in motion detection systems.
Figure 5B:
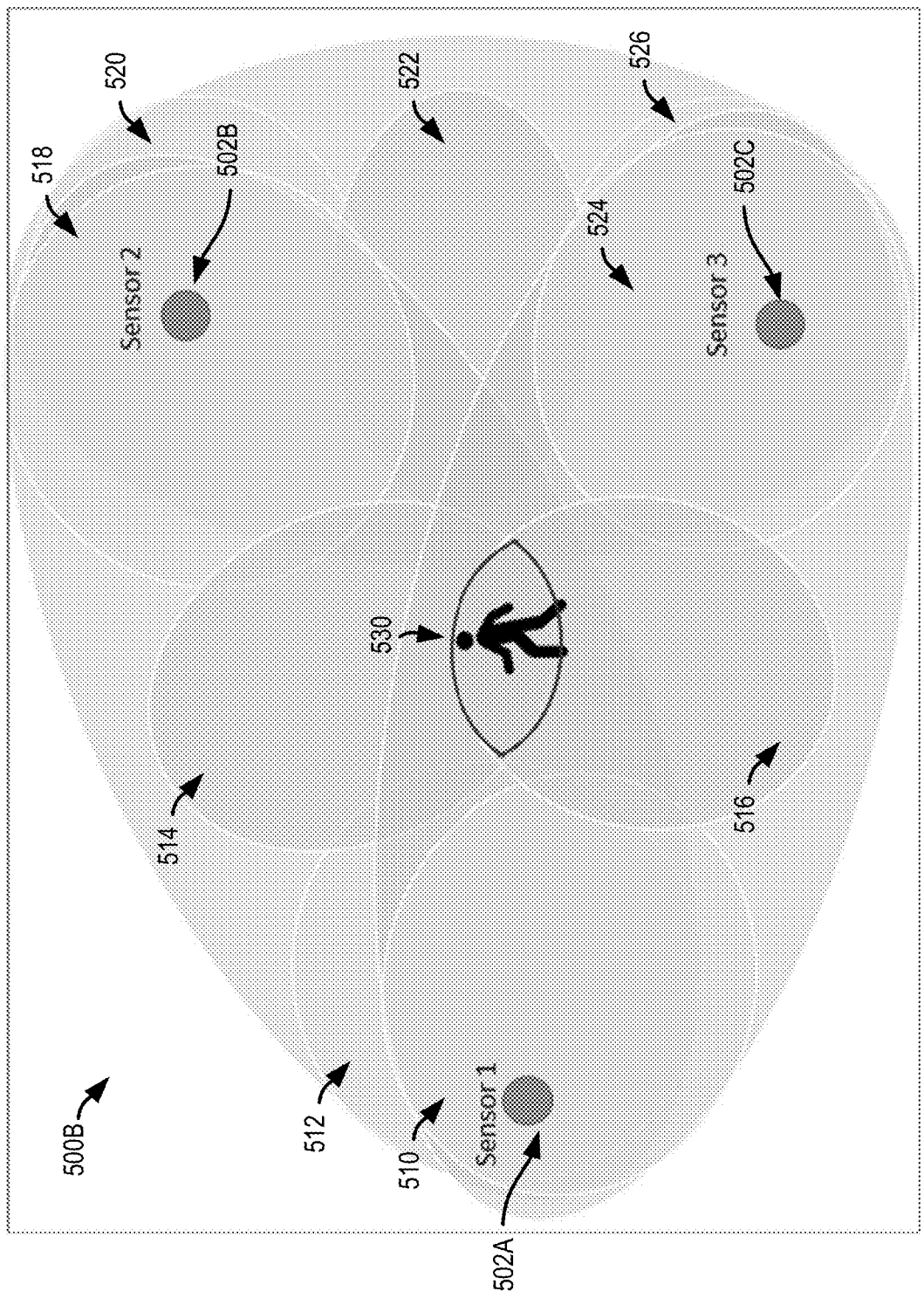

FIGS. 5A and 5B are diagrams showing example motion localization zones 502 in motion detection systems 500. In the examples shown, the motion detection systems 500 include wireless communication devices 502, which may be implemented similar to the wireless communication devices 102 of FIG. 1. The systems 500 may operate similar to the system 400 of FIGS. 4A-4B (e.g., may detect motion of an object in the space based on bi-directional channel sounding). In the examples shown, the wireless communication devices 502 iterate the role of transmitter and receiver with a minimal interval (e.g., milliseconds apart) between changing roles in order to capture very similar physical environment.

In the example system 500A of FIG. 5A, if the wireless communication device 502A (in receiver mode) reports larger intensity of detected wireless channel variation over time as compared to the same report coming from the wireless communication device 502B (in receiver mode), the system 500A may determine that an object is moving in the motion detection zone 508 ("Near sensor 2"). Likewise, if the wireless communication device 502B (in receiver mode) reports a larger intensity of detected wireless channel variation over time as compared to the same report coming from the wireless communication device 502A (in receiver mode), the system 500A may determine that an object is moving in the motion detection zone 504 ("Near sensor 1"). If both wireless communication devices 502 report similar amounts of channel variation over time, the system 500A may determine that an object is moving in the motion detection zone 506 ("middle area").

The example system 500B shown in FIG. 5B is similar to the example system 500A shown in FIG. 5A, except with three wireless communication devices 502. Due to having more wireless communication devices 502, the system 500B of FIG. 5B includes more motion detection zones than the system 500A. For instance, the system 500A includes three motion detection zones 504, 506, 508, and the system 500B includes nine motion detection zones, 510, 512, 514, 516, 518, 520, 522, 524, 526. In the example shown, the system 500B can determine, based on bi-directional channel sounding, that the object 530 is moving inside the intersection of the motion detection zone 514 ("middle zone of sensor 1 and 3") and the motion detection zone 516 ("middle zone of sensor 1 and 2").

Figure 6:
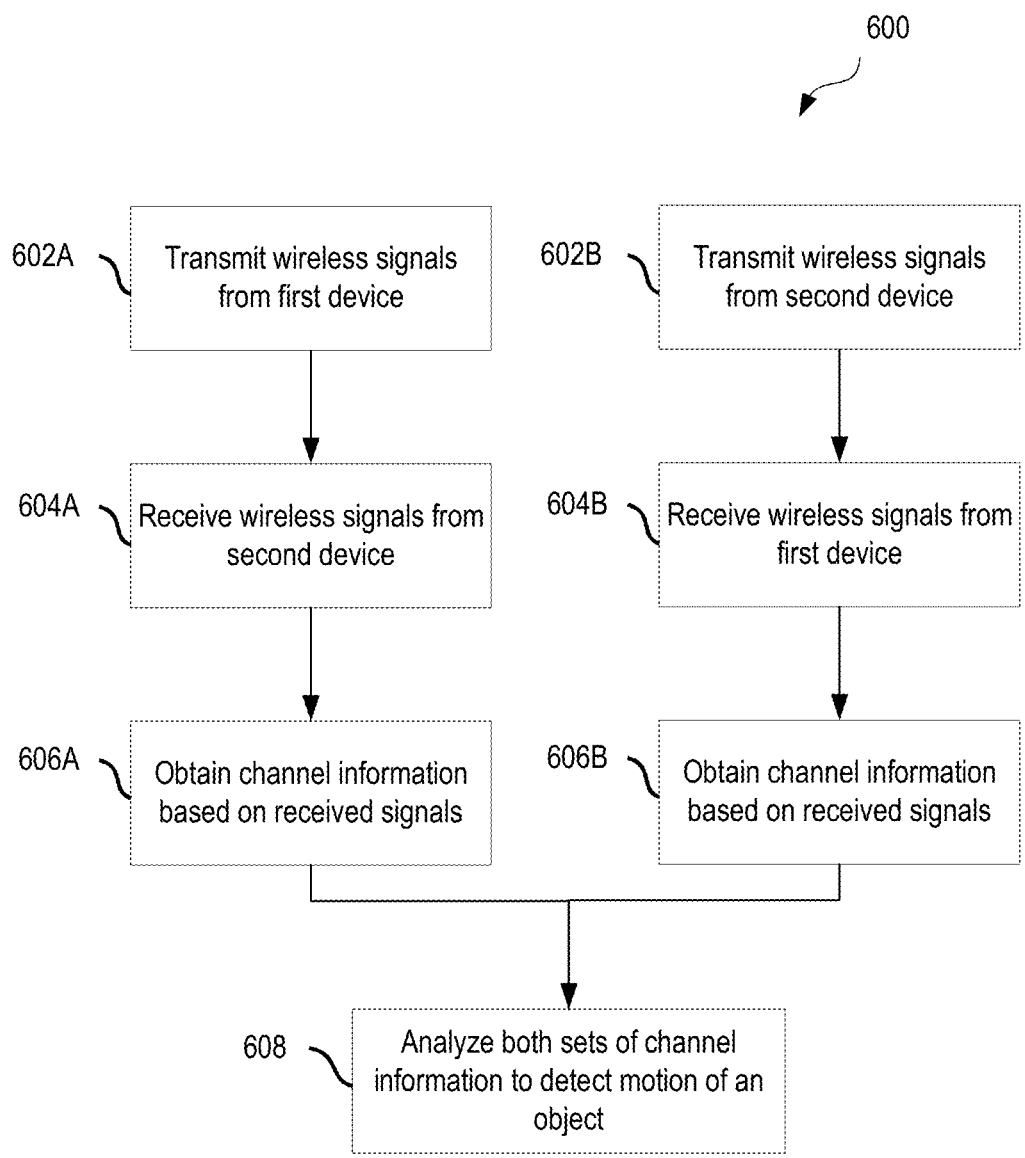
FIG. 6 is a flow diagram showing an example process for detecting motion of an object in a space based on bi-directional channel sounding.

FIG. 6 is a flow diagram showing an example process 600 for detecting motion of an object in a space based on bi-directional channel sounding. Operations of the process 600 may be performed by one or more processors of a device coupled to a wireless network that serves the space. For example, operations in the example process 600 may be performed by the processor subsystem 114 of the example wireless communication devices 102 in FIG. 1 to analyze channel state information beamforming state information, beamforming steering matrix state information, or other information that represents the effective transfer function of the space based on bi-directional channel sounding between two devices 102 and detect whether motion has occurred in the space. The example process 600 may be performed by another type of device. The example process 600 may include additional or different operations, and the operations may be performed in the order shown or in another order. In some cases, one or more of the operations shown in FIG. 6 are implemented as processes that include multiple operations, sub-processes or other types of routines. In some cases, operations can be combined, performed in another order, performed in parallel, iterated, or otherwise repeated or performed in another manner.

In the example process 600, the operations 602A, 604A, and 606A may be performed by a first wireless communication device, while the operations 602B, 604B, and 606B may be performed by a second wireless communication device. For instance, referring to the example shown in FIGS. 4A-4B, the operations 602A, 604A, and 606A may be performed by the wireless device 402A, and the operations 602B, 604B, and 606B may be performed by the wireless device 402B. As another example, the operations 602A, 604A, and 606A may be performed by the wireless communication device 502A of FIG. 5A, and the operations 602B, 604B, and 606B may be performed by the wireless communication device 502B of FIG. 5A.

At 602, wireless signals are transmitted through a space between wireless communication devices. For instance, referring to the example shown in FIGS. 4A-4B, the wireless signals 404A, 404B are transmitted by the wireless devices 402A, 402B, respectively. The wireless signals may be radio frequency (RF) signals, and may include reference or beacon signals used to determine whether motion has occurred in the space. In some cases, the wireless signals are formatted according to a standard (e.g., the 802.11 Wi-Fi standard). The wireless signals may be formatted in another manner. In some implementations, the signals are transmitted bi-directionally between wireless devices 402A, 402B. In some cases, a first set of wireless signals is transmitted in a first direction from the first wireless communication device 402A to the second wireless communication device 402B, and a second set of wireless signals is transmitted in a second direction from the second wireless communication device 402B to the first wireless communication device 402A.

At 604, the signals transmitted by the other device at 602 are received, and at 606, the received signals are analyzed to obtain channel information. In an example, a first set of channel information may be received from the first wireless communication device 402A and a second set of channel information may be received from the second wireless communication device 402B. In some implementations, the channel information includes CSI (e.g., a channel response), and the analysis may be based on a mathematical theory of estimation, as described above. In some implementations, the channel information includes beamforming state information or beamforming steering matrix information. The channel information may include other information that represents the effective transfer function of the space.

At 608, the sets of channel information obtained at 606A, 606B are analyzed to detect whether an object moved in the space traversed by the wireless signals. The analysis at 608 may be performed by any device communicably coupled to the wireless devices that transmit/receive. In some implementations, the analysis is performed by one of such devices (e.g., where the device is designated as a hub device). In some implementations, the analysis is performed by a remote server that is communicably coupled to the wireless devices (e.g., in the cloud). In some implementations, after motion has been detected, an action or programmed response may be taken. For example, a computing device (e.g., the device performing the analysis at 608) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

In some implementations, a category of motion may be detected at 608. For example, it may be determined whether a moving object is relatively large (e.g., a human) or relatively small (e.g., a dog or cat). In addition, in some implementations, a relative location of the detected motion may be determined. For example, the detected motion may be localized to a motion detection zone, as described above with respect to FIGS. 5A-5B. The category of motion or relative location may be determined, in some cases, based on a comparison of the respective sets of channel information, or based on another analysis of the sets of channel information. In an example, it may be determined that an object is moving in a zone near the first wireless communication device 402A when the first set of channel information indicates more channel variation over time compared to the second set of channel information, that an object is moving in a zone near the second wireless communication device 402B when the second set of channel information indicates more channel variation over time compared to the first set of channel information, as described in FIG. 5A. In other example, it may be determined that an object is moving in a zone between the first wireless communication device 402A and the second wireless communication device 402B when the first set of channel information indicates similar channel variation over time compared to the second set of channel information, as described in FIG. 5B.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, motion is detected based on bi-directional channel sounding.

In a first example, a first set of channel information from a first device is obtained. The first set of channel information is based on a first set of wireless signals transmitted from a second device through a space at a first time in a timeframe. A second set of channel information is obtained from the second device. The second set of channel information based on a second set of wireless signals transmitted from the first device through the space at a second time in the timeframe. The first and second sets of channel information are analyzed to detect a category of motion or a location of detected motion in the space during the timeframe.

Implementations of the first example may include one or more of the following features. The first and second sets of channel information are based on wireless signals transmitted bi-directionally through the space between the first and second device. The wireless signals include reference signals or beacon signals. The first set of wireless signals is transmitted in a first direction from the first device to the second device, and the second set of wireless signals is transmitted in a second direction from the second device to the first device. Comparing the first set of channel information to the second set of channel information to determine whether an object is moving in a zone near the first device or the second device.

Implementations of the first example may include one or more of the following features. Determining that an object is moving in a zone near the first device when the first set of channel information indicates more channel variation over time compared to the second set of channel information, or determining that an object is moving in a zone near the second device when the second set of channel information indicates more channel variation over time compared to the first set of channel information. Determining that an object is moving in a zone between the first device and the second device when the first set of channel information indicates similar channel variation over time compared to the second set of channel information. Determining the category of motion. Identifying a type of moving object. Determining that a small object is moving closer to the first device than to the second device when the first set of channel information indicates less channel perturbation over time compared to the second set of channel perturbation, or determining that a large object is moving closer to the second device than to the first device when the first set of channel information indicates greater channel perturbation over time compared to the second set of channel perturbation.

In some implementations, a computing system (e.g., a wireless communication device, computer system or other type of system communicatively coupled to the wireless communication device) includes a data processing apparatus and memory storing instructions that are operable when executed by the data processing apparatus to perform one or more operations of the first example. In some implementations, a motion detection device includes one or more processors and a memory comprising instructions which, when executed by the one or more processors, cause the motion detection device to perform one or more operations of the first example. In some implementations, a computer-readable medium stores instructions that are operable when executed by a data processing apparatus to perform one or more operations of the first example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub combination.

A number of embodiments have been described. Nevertheless, it will be understood that various modifications can be made. Accordingly, other embodiments are within the scope of the following claims.

The invention claimed is:

1. A method comprising:
   obtaining first and second sets of channel information based on first and second sets of wireless signals transmitted bi-directionally through a space between a first device and a second device during a timeframe,
   wherein the first set of channel information is based on the first set of wireless signals transmitted to the first device from the second device,
   and the second set of channel information is based on the second set of wireless signals transmitted to the second device from the first device;
   comparing a first channel variation indicated by the first set of channel information with a second channel variation indicated by the second set of channel information, wherein the comparison analyzes similarity of the first and second channel variations; and
   based on the comparison, detecting a category of motion or a location of detected motion in the space during the timeframe.

2. The method of claim 1, wherein the wireless signals include reference signals or beacon signals.

3. The method of claim 1, wherein the first set of wireless signals is transmitted in a first direction toward the first device from the second device, and the second set of wireless signals is transmitted in a second direction toward the second device from the first device.

4. The method of claim 1, comprising comparing the first channel variation indicated by the first set of channel information to the second channel variation indicated by the second set of channel information to determine whether an object is moving in a zone near the first device or the second device.

5. The method of claim 4, wherein determining whether an object is moving in a zone near the first device or the second device comprises:
   determining that an object is moving in a zone near the second device when the first set of channel information indicates more channel variation over time compared to the second set of channel information; or
   determining that an object is moving in a zone near the first device when the second set of channel information indicates more channel variation over time compared to the first set of channel information.

6. The method of claim 1, comprising determining that an object is moving in a zone between the first device and the second device when the first set of channel information indicates similar channel variation over time compared to the second set of channel information.

7. The method of claim 1, comprising determining the category of motion based on the comparison.

8. The method of claim 7, wherein determining the category of motion comprises identifying a type of moving object.

9. The method of claim 1, comprising at least one of:
   determining that a small object is moving closer to the first device than to the second device when the first set of channel information indicates less channel variation over time compared to the second set of channel information; or
   determining that a large object is moving closer to the second device than to the first device when the first set of channel information indicates greater channel variation over time compared to the second set of channel information.

10. A non-transitory computer-readable medium comprising instructions which, when executed by one or more processors, cause the one or more processors to perform operations comprising:
    obtaining first and second sets of channel information based on first and second sets of wireless signals transmitted bi-directionally through a space between a first device and a second device during a timeframe,
    wherein the first set of channel information is based on the first set of wireless signals transmitted to the first device from the second device,
    and the second set of channel information is based on the second set of wireless signals transmitted to the second device from the first device;
    comparing a first channel variation indicated by the first set of channel information with a second channel variation indicated by the second set of channel information, wherein the comparison analyzes similarity of the first and second channel variations; and
    based on the comparison, detecting a category of motion or a location of detected motion in the space during the timeframe.

11. The computer-readable medium of claim 10, wherein the wireless signals include reference signals or beacon signals.

12. The computer-readable medium of claim 10, wherein the first set of wireless signals is transmitted in a first direction toward the first device from the second device, and the second set of wireless signals is transmitted in a second direction toward the second device from the first device.

13. The computer-readable medium of claim 10, the operations comparing the first channel variation indicated by the first set of channel information to the second channel variation indicated by the second set of channel information to determine whether an object is moving in a zone near the first device or the second device.

14. The computer-readable medium of claim 13, wherein determining whether an object is moving in a zone near the first device or the second device comprises:
   determining that an object is moving in a zone near the second device when the first set of channel information indicates more channel variation over time compared to the second set of channel information; or
   determining that an object is moving in a zone near the first device when the second set of channel information indicates more channel variation over time compared to the first set of channel information.

15. The computer-readable medium of claim 10, the operations comprising determining that an object is moving in a zone between the first device and the second device when the first set of channel information indicates similar channel variation over time compared to the second set of channel information.

16. The computer-readable medium of claim 10, the operations comprising determining the category of motion based on the comparison.

17. The computer-readable medium of claim 16, wherein determining the category of motion comprises identifying a type of moving object.

18. The computer-readable medium of claim 10, the operations comprising:
   determining that a small object is moving closer to the first device than to the second device when the first set of channel information indicates less channel variation over time compared to the second set of channel information; or
   determining that a large object is moving closer to the second device than to the first device when the first set of channel information indicates greater channel variation over time compared to the second set of channel information.

19. A system comprising:
   a plurality of wireless communication devices comprising a first wireless communication device and a second wireless communication device;
   data processing apparatus;
   memory storing instructions that are operable when executed by the data processing apparatus to perform operations comprising:
      obtaining first and second sets of channel information based on first and second sets of wireless signals transmitted bi-directionally through a space between the first and second wireless communication devices during a timeframe,
      wherein the first set of channel information is based on the first set of wireless signals transmitted to the first wireless communication device from the second wireless communication device,
      and the second set of channel information is based on the second set of wireless signals transmitted to the second wireless communication device from the first wireless communication device;
      comparing a first channel variation indicated by the first set of channel information with a second channel variation indicated by the second set of channel information, wherein the comparison analyzes similarity of the first and second channel variations; and
      based on the comparison, detecting a category of motion or a location of detected motion in the space during the timeframe.

20. The system of claim 19, wherein the wireless signals include reference signals or beacon signals.

21. The system of claim 19, wherein the first set of wireless signals is transmitted in a first direction toward the first wireless communication device from the second wireless communication device, and the second set of wireless signals is transmitted in a second direction toward the second wireless communication device from the first wireless communication device.

22. The system of claim 19, the operations comprising comparing the first channel variation indicated by the first set of channel information to the second channel variation indicated by the second set of channel information to determine whether an object is moving in a zone near the first wireless communication device or the second wireless communication device.

23. The system of claim 22, wherein determining whether an object is moving in a zone near the first wireless communication device or the second wireless communication device comprises:
   determining that an object is moving in a zone near the second wireless communication device when the first set of channel information indicates more channel variation over time compared to the second set of channel information; or
   determining that an object is moving in a zone near the first wireless communication device when the second set of channel information indicates more channel variation over time compared to the first set of channel information.

24. The system of claim 19, the operations comprising determining that an object is moving in a zone between the first wireless communication device and the second wireless communication device when the first set of channel information indicates similar channel variation over time compared to the second set of channel information.

25. The system of claim 19, the operations comprising determining the category of motion based on the comparison.

26. The system of claim 25, wherein determining the category of motion comprises identifying a type of moving object.

27. The system of claim 19, the operations comprising at least one of:
   determining that a small object is moving closer to the first wireless communication device than to the second wireless communication device when the first set of channel information indicates less channel variation over time compared to the second set of channel information; or
   determining that a large object is moving closer to the second wireless communication device than to the first wireless communication device when the first set of channel information indicates greater channel variation over time compared to the second set of channel information.

* * * * *